United States Patent
Iyer et al.

(10) Patent No.: US 7,111,124 B2
(45) Date of Patent: Sep. 19, 2006

(54) SET PARTITIONING FOR CACHE MEMORIES

(75) Inventors: Ravishankar R. Iyer, Hillsboro, OR (US); Pete D. Vogt, Boulder, CO (US)

(73) Assignee: Intel Corporation, Santa Clara, CA (US)

(*) Notice: Subject to any disclaimer, the term of this patent is extended or adjusted under 35 U.S.C. 154(b) by 640 days.

(21) Appl. No.: 10/097,055

(22) Filed: Mar. 12, 2002

(65) Prior Publication Data

US 2003/0177313 A1     Sep. 18, 2003

(51) Int. Cl.
*G06F 13/16*     (2006.01)

(52) U.S. Cl. .................. 711/129; 711/128; 711/130; 711/150; 711/153; 711/170; 711/173

(58) Field of Classification Search ............... 711/129, 711/128, 130, 150, 153, 170, 173, 131, 133, 711/137, 147, 1, 209; 718/104
See application file for complete search history.

(56) References Cited

U.S. PATENT DOCUMENTS

| | | | | |
|---|---|---|---|---|
| 5,627,994 A | * | 5/1997 | Levy et al. ............... | 711/150 |
| 6,324,632 B1 | * | 11/2001 | McIntosh-Smith .......... | 711/173 |
| 6,360,299 B1 | * | 3/2002 | Arimilli et al. ............ | 711/137 |
| 6,507,895 B1 | * | 1/2003 | Wang et al. ............... | 711/137 |
| 6,598,124 B1 | * | 7/2003 | Damron et al. ............ | 711/133 |

FOREIGN PATENT DOCUMENTS

| JP | 2003256145 A | * | 9/2003 |
|---|---|---|---|
| WO | WO 2004079488 A2 | * | 9/2004 |

OTHER PUBLICATIONS

"Set associative cache", http://burks.brighton.ac.uk/burks/foldoc/92/104.htm, 1 pg., (Nov. 15, 2001).
Mazzucco, P., "The Fundamentals of Cache", http://www.systemlogic.net/articles/00/10/cache/print.php, 12 pgs., (Oct. 17, 2000).

* cited by examiner

*Primary Examiner*—B. James Peikari
(74) *Attorney, Agent, or Firm*—Schwegman, Lundberg, Woessner & Kluth, P.A.

(57) ABSTRACT

A method, apparatus, and signal-bearing medium for improving the performance of a cache when request streams with different spatial and/or temporal properties access the cache. A set in the cache is partitioned into subsets with different request streams using different subsets within the cache. In this way, interference between the different request streams is reduced.

16 Claims, 4 Drawing Sheets

SET PARTITIONING FOR CACHE MEMORIES

FIELD

An embodiment of the invention relates generally to computers and more particularly to partitioning a cache within a computer.

BACKGROUND

A computer stores data in memory. Data may be computer-executable instructions and control structures used to operate the computer or information of importance to a user of the computer. In order to do useful work, the computer operates on and performs manipulations against this data; for example, the computer might add two pieces of data together or compare two pieces of data to determine which is larger. Ideally, a computer would have a singular, indefinitely large and very fast memory, in which any particular data would be immediately available to the computer. In practice this has not been possible because memory that is very fast is also very expensive.

Thus, computers typically have a hierarchy (or levels) of memory, each level of which has greater capacity than the preceding level, but which is also slower with a less expensive per-unit cost. These levels of the hierarchy may form a subset of one another, that is, all data in one level may also be found in the level below, and all data in that lower level may be found in the one below it, and so on until we reach the bottom of the hierarchy. In order to minimize the performance penalty that the hierarchical memory structure introduces, the computer would like to store the most frequently-used data in the fastest memory and the least frequently-used data in the slowest memory.

For example, a computer might contain:

1) a cache that contains the most frequently-used data;
2) a RAM (Random Access Memory) that contains all the data in the cache plus the next-most frequently-used data; and
3) a disk drive that contains all the data in the computer.

In order to determine which data should be placed in the faster memory; for example in the cache or RAM, the computer may attempt to predict which data will be frequently used. In order to predict use frequency, computers have typically used the theory of "temporal locality of reference": recently-used data is likely to be used again soon. Using this theory, when the computer needs a piece of data, it looks first in the cache. If the data is not in the cache, the computer then retrieves the data from a lower level of memory, such as RAM or a disk drive, and places the data in the cache. If the cache is already full of data, the computer must determine which data to remove from the cache in order to make room for the data currently needed. One removal method is for the computer to replace the data that has been unused for the longest time. This exploits a corollary of temporal locality: if recently-used data is likely to be used again, then the best candidate for removal is the least recently-used data. Thus, one method for replacing data in fast memory is the Least Recently Used (LRU) method.

The LRU method only yields good computer performance when the "temporal locality of reference" theory holds true; that is, in situations where the recently-used data is actually likely to be used again soon. If the temporal locality of reference theory does not hold true, then the LRU method by itself performs poorly. An example of when the LRU method may perform poorly is when multiple instruction streams (threads or processes) are all accessing the same cache. Multiple instruction streams can result from, e.g., a computer that has multiple processors, multiple cores within a processor, or multiple instruction streams executing concurrently on the same processor. These instruction streams may access completely different data, yet their cache accesses may be interspersed.

Thus, when multiple streams are accessing data, the temporal locality of reference theory does not necessarily hold true across multiple streams, and poor performance can result because the streams may interfere with each other's cache use, and the computer may discard the data from the cache that is actually likely to be used next.

DETAILED DESCRIPTION

Figure 1:
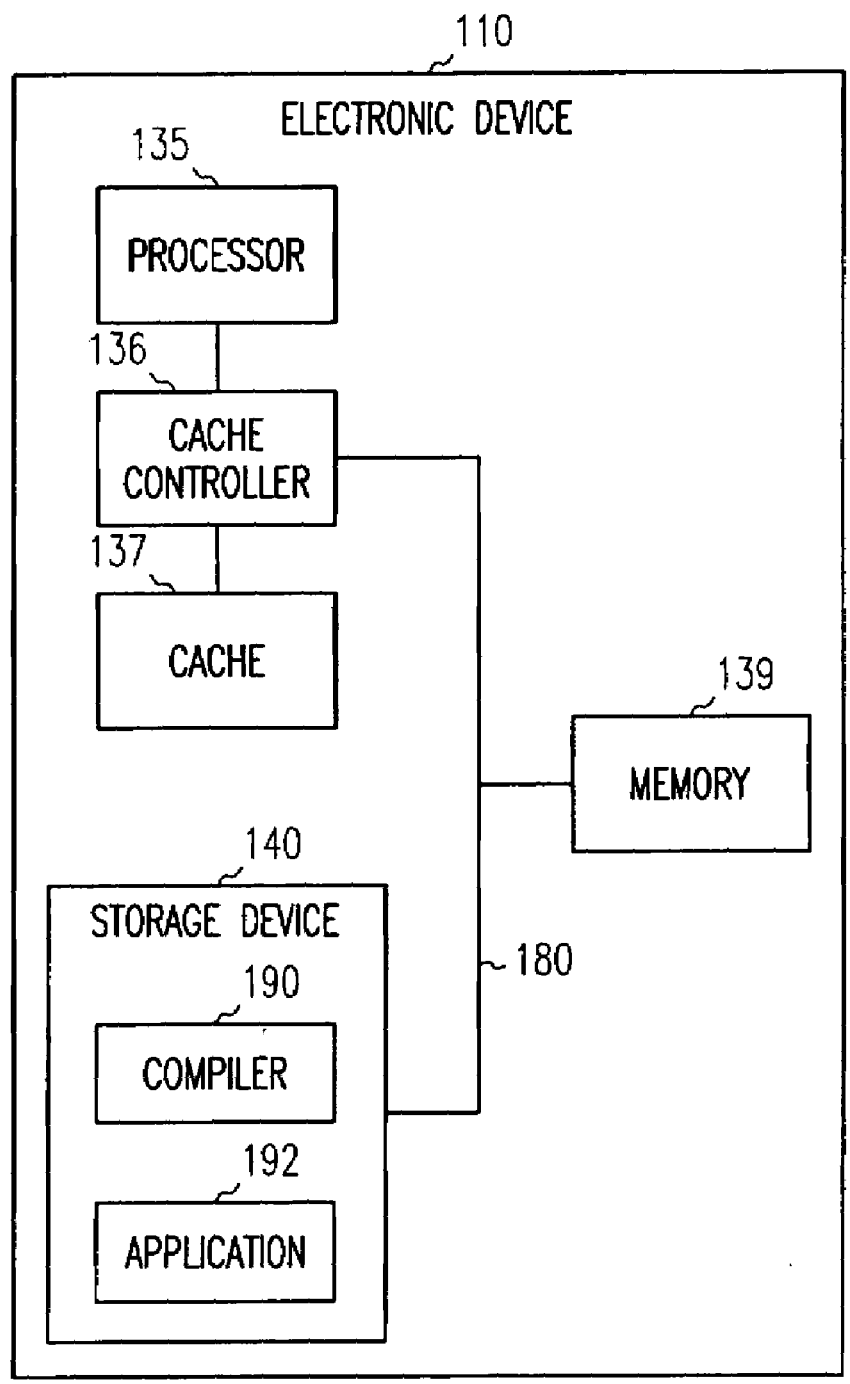
FIG. 1 depicts a block diagram of an electronic device for implementing an embodiment of the invention.

FIG. 1 depicts a block diagram of an electronic device for implementing an embodiment of the invention. An electronic device 110 may include a cache controller 136, a memory 139, and a storage device 140, all connected via a bus 180. The cache controller 136 may be connected to a processor 135 and a cache 137.

The processor 135 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 135 may execute instructions and may include that portion of the electronic device 110 that controls the operation of the entire electronic device. Although not depicted in FIG. 1, the processor 135 typically includes a control unit that organizes data and program storage in memory and transfers data and other information between the various parts of the electronic device 110. The processor 135 may request data from the cache controller 136, which requests the data from the cache 137. If the requested data is not present in the cache 137, then the processor may look for the data in the memory 139. If the requested data is not present in the memory 139, then the processor may look for the data in the storage device 140.

Although the electronic device 110 is shown to contain only a single processor 135 and a single bus 180, in another embodiment an electronic device may have multiple processors and/or have multiple buses with some or all performing different functions in different ways.

The cache controller 136 controls the storage and retrieval of data from the cache 137. Although the cache controller 136 is drawing as being separate from the processor 135 and the cache 137, in other embodiments the cache controller 136 may be included in the processor 135 or the cache 137. In an embodiment, the cache controller 136 may be implemented in hardware. But, in another embodiment, the cache controller 136 may be implemented in instructions that execute on a processor. Processing for the cache controller 136 is further described below with reference to FIGS. 3 and 4.

The cache 137 is a level of memory hierarchy encountered once an address leaves the processor 135. The cache 137 stores data that has been used by the processor 135 and might be used in the future. Although only one cache 137 is shown, in another embodiment the cache 137 may have multiple levels. In an embodiment, the processor 135 is a multi-threaded processor and the cache 137 is an L1/L2/L3 (Level 1/Level 2/Level 3) cache for the multithreaded processor where different request streams correspond to different threads that time-share the processor 135. In another embodiment, the cache 137 is an L3 (Level 3) cache and the processor 135 is a multi-core processor where different request streams correspond to the threads/processes running on each core. In another embodiment, the cache 137 is shared by multiple processors with each processor having its own request stream and priority. In another embodiment, the cache 137 is an eDRAM chipset cache, and different request streams correspond to the processor 135 to memory 139 stream and an I/O device (such as the storage device 140) to memory 139 request stream. In another embodiment, the cache 137 is a software cache used by proxy servers. In an embodiment, the cache 137 is organized in a set-associative scheme. In another embodiment, the cache 137 is organized in a fully associative scheme. In another embodiment, the cache 137 is organized in any appropriate scheme. The cache 137 is further described below with reference to FIG. 2.

The memory 139 may represent one or more mechanisms for storing data. For example, the memory 139 may include random access memory (RAM), magnetic disk storage media, optical storage media, or any other appropriate type of machine-readable media. Although only one memory 139 is shown, in another embodiment, multiple types and/or multiple levels of memory may be present.

The storage device 140 may represent one or more mechanisms for storing data. For example, the storage device 140 may include read only memory (ROM), random access memory (RAM), magnetic disk storage media, optical storage media, flash memory devices, and/or other machine-readable media. In other embodiments, any appropriate type of storage device may be used. Although only one storage device 140 is shown, multiple storage devices and multiple types of storage devices may be present. Further, although the electronic device 110 is drawn to contain the storage device 140, it may be distributed across other electronic devices.

The storage device 140 may include a compiler 190 and an application 192. The compiler 190 may contain instructions that execute on the processor 135 to compile source code in the application 192 into object code for execution on the processor 135. The compiler 190 may assign stream identifiers to portions of the object code as further described below with reference to FIGS. 3 and 4. Although the compiler 190 is shown to be included in the storage device 140, in another embodiment the compiler 190 may be in another electronic device. Of course, the storage device 140 may also contain additional software and data (not shown), which is not necessary to understanding an embodiment of the invention. Although only one application 192 is shown, in another embodiment multiple application may be present, some or all of which may generate multiple instruction streams to execute on the processor 135.

The bus 180 may represent one or more busses (e.g., PCI, ISA (Industry Standard Architecture), X-Bus, EISA (Extended Industry Standard Architecture), or any other appropriate bus and/or bridge (also called a bus controller).

The electronic device 110 may be implemented using any suitable hardware and/or software, such as a personal computer or other appropriate electronic device. Portable computers, laptop or notebook computers, PDAs (Personal Digital Assistants), two-way alphanumeric pagers, portable telephones, pocket computers, network appliances, mini-computers, and mainframe computers are examples of other possible configurations of the electronic device 110. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that employs a cache.

As will be described in detail below, aspects of an embodiment pertain to specific apparatus and method elements implementable on an electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium (e.g., read-only memory devices attached to or within an electronic device, such as a CD-ROM readable by a CD-ROM drive);

(2) alterable information stored on a rewriteable storage medium (e.g., a hard disk drive or diskette); or (3) information conveyed to an electronic device by a communications medium, such as through a computer or the telephone network accessed via a network, including wireless communications.

Such signal-bearing media, when carrying machine-readable instructions that direct the functions of the present invention, represent embodiments of the present invention.

Figure 2:
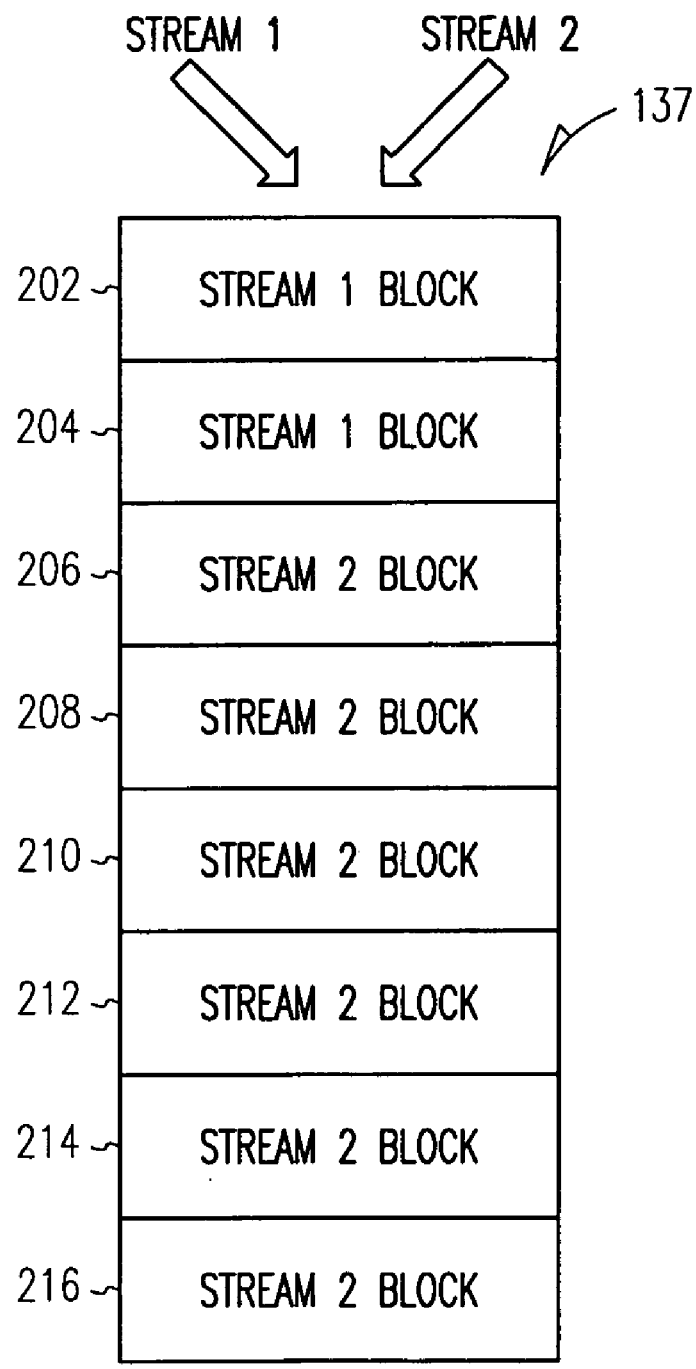
FIG. 2 depicts a block diagram of an example cache, according to an embodiment of the invention.

FIG. 2 depicts a block diagram of example contents of the cache 137, according to an embodiment of the invention. Shown in the cache 137 is one set including 8 blocks: blocks 202, 204, 206, 208, 210, 212, 214, and 216. A set is a group of blocks in the cache 137. Blocks 202 and 204 are associated with stream 1 and form the first subset of the set. Blocks 206, 208, 210, 212, 214, and 216 are associated with stream 2 and form the $2^{nd}$ subset of the set. Thus, the set is broken down into two subsets corresponding to the two streams. Although the example of FIG. 2 shows the cache 137 with one set, two subsets corresponding to two streams, and eight blocks with two blocks in the first subset and six blocks in the second subset, in another embodiment the cache 137 may contain any number of sets, subsets, blocks, and allocation of blocks within subsets.

In an embodiment, the cache 137 may be said to be "set associative," meaning that a block can be placed in a restricted set of places in the cache 137. A block may be first mapped onto a set, and then the block may be placed anywhere within the set. In an embodiment, the set for a given block may be chosen by bit selection; that is, (block address) MOD (number of sets in the cache), but in another embodiment any appropriate set selection technique may be used. If there are N blocks in a set, the cache placement is said to be n-way set associative. Thus, the number of ways is the number of blocks in a set. In another embodiment, the cache 137 is organized in a fully associative scheme. In another embodiment, the cache 137 may be organized in any appropriate scheme.

In an embodiment, blocks in the cache 137 are accessed via an address, which may include a block address and a block offset. The block address may be further broken down into a tag and an index. The tag may be used to check all the blocks in the set and the index may be used to select the set. The block offset may be the address of the desired data within the block. In another embodiment, any appropriate addressing scheme may be used.

Since the cache 137 is partitioned into subsets within a set, the streams do not interfere with each other. Thus, even if one stream is poorly behaved, e.g., it demonstrates a lack of temporal locality of reference, the performance of the other stream or streams will not be impacted.

Figure 3:
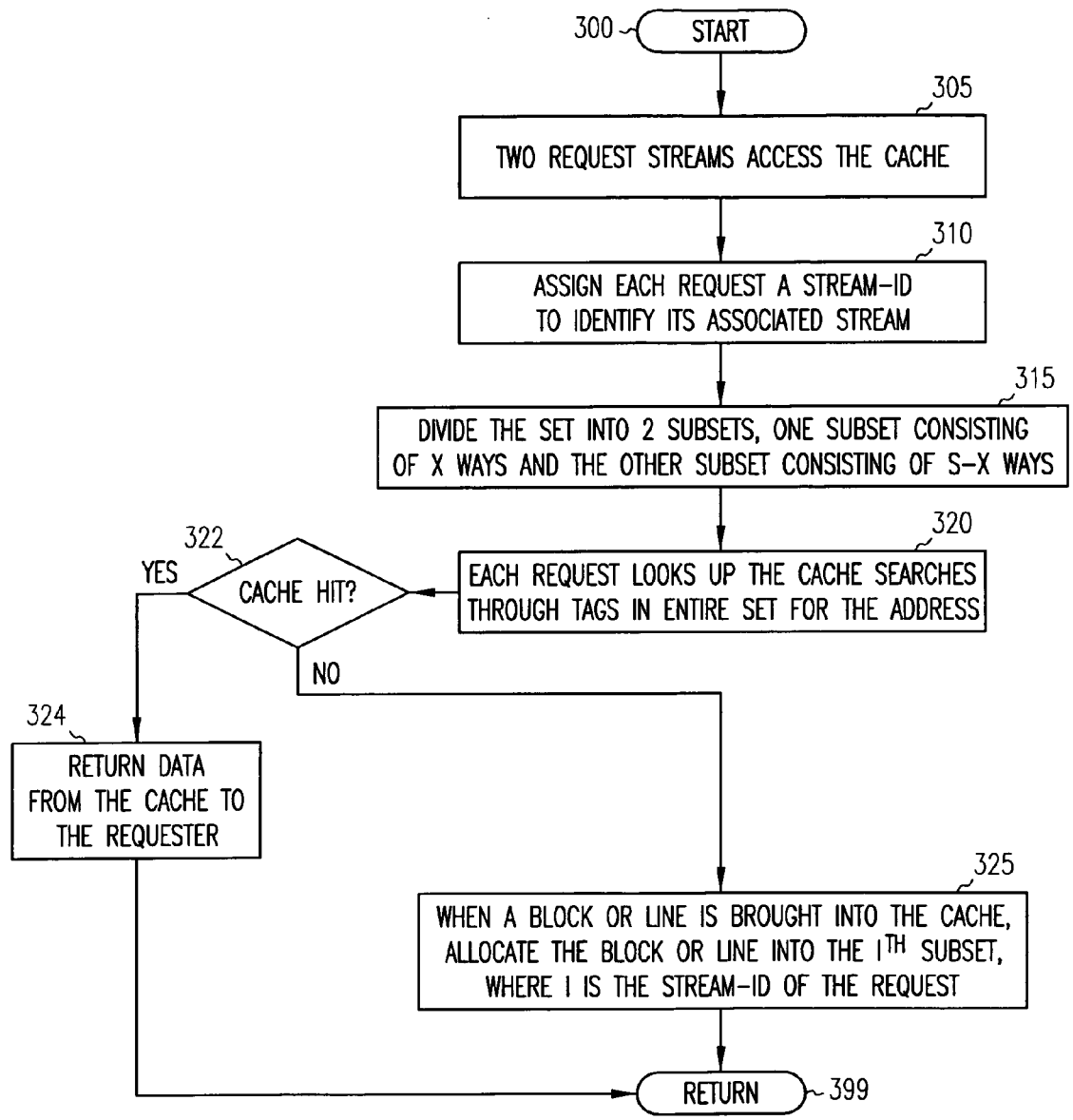
FIG. 3 depicts a flowchart of example processing, according to an embodiment of the invention.

FIG. 3 depicts a flowchart of example processing for two request streams, according to an embodiment of the invention. Control begins at block 300. Control then continues to block 305 where two request streams possessing potentially different spatial and/or temporal properties access the cache 137. Control then continues to block 310 where the cache controller 136 may assign a stream identifier (0 or 1 in an embodiment, although any appropriate identifier may be used) to each request to identify the associated stream. In another embodiment, the compiler 190 may assign the stream identifier. In an embodiment, the stream identifier may indicate the priority of the stream. In an embodiment, the user of the application 192 may specify the priority of streams based on, e.g., knowledge of the properties of the streams or the level of importance/criticality of the stream. In another embodiment, the developer of the application 192 may specify the priority of the streams based, e.g., on the knowledge of the properties of the streams. In another embodiment, the manufacturer of the application 192 may specify the priority of the streams based, e.g., on its intended functionality.

Control then continues to block 315 where the cache controller 136 divides the set into 2 subsets, one subset consisting of X ways and the other subset consisting of S−X ways where "S" (an integer) may be the number of ways in each set in the cache 137 and "X" (also an integer) may be a tunable parameter. In an embodiment the developer of the cache 137 may assign the cache 137 with only one possibility for the value of X. In another embodiment, X may be a configurable parameter that is available to be changed by the application 192, the user of the application 192, and/or the compiler 190. By keeping X low, one stream is restricted to a smaller space in the set. (In the example of FIG. 2, S=8, X=2 for stream 1, and S−X=6 for stream 2.) In an embodiment, X may be found in a configuration file. In another embodiment, X may be accessible via the BIOS (Basic Input/Output System) of the electronic device 110.

Control then continues to block 320 where the cache controller 136 searches through all tags in the set for each cache lookup/access request for a given stream and locates the requested block if it is present in the cache 137. Control then continues to block 322 where the cache controller 136 determines whether the requested data was found in block 320.

If the determination at block 322 is true, the data is found in the cache 137, so control continues to block 324 where the cache controller 136 returns the data from the cache 137 to the instruction executing on the processor 135 that requested the data. Finding the requested data in the cache 137 is called a cache hit. Control then continues to block 399 where the function returns.

If the determination at block 322 is false, then the data is not found in the cache 137, so the cache controller 136 generates a cache miss, which may cause the cache controller 136 to look for the data in another level of the cache 137 (if one is present) or the processor 135 may request the data from another level of storage, which may be the memory 139 or the storage device 140. If the processor 135 finds the requested data in another level of storage, then control continues to block 325 where the data is brought into the cache 137 and the cache controller 136 may allocate the block of data into the I$^{th}$ subset in the cache 137, where I is the identifier of the request stream and the identifier of the associated subset. Control then continues to block 399 where the function returns.

Any appropriate cache replacement policy may be used, depending on the type of cache being used, the properties of the streams, and the operating environment. Existing replacement policies may be used for each subset instead of for each set.

Figure 4:
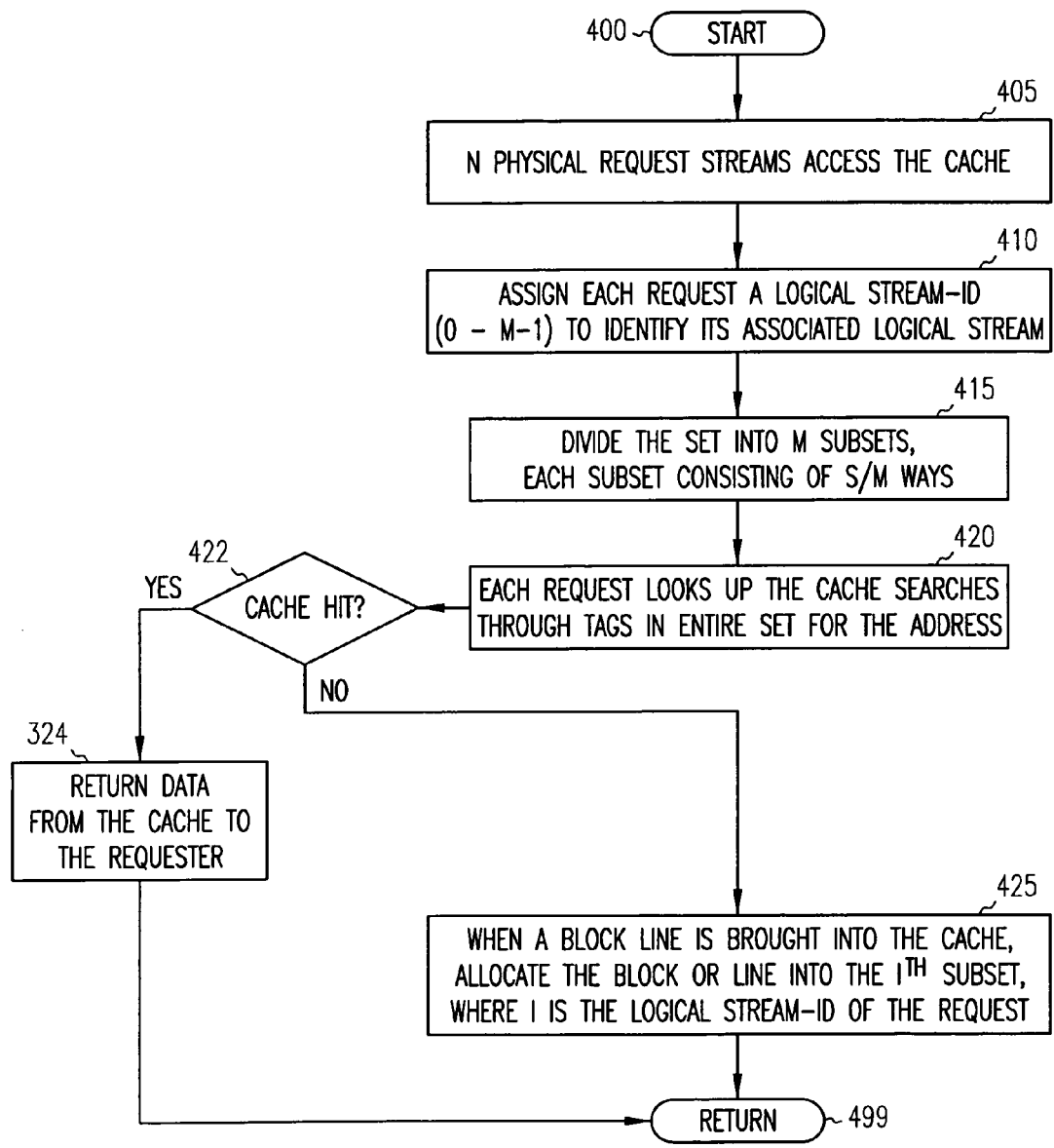
FIG. 4 depicts a block diagram of example processing, according to an embodiment of the invention.

FIG. 4 depicts a block diagram of example processing for another embodiment with multiple request streams.

Control begins at block 400. Control then continues to block 405 where multiple request streams possessing potentially different spatial and/or temporal properties access the cache 137 where N is the number of physical request streams. Control then continues to block 410 where the cache controller 136 may assign a logical stream identifier (0 to M−1 in an embodiment, although any appropriate identifier may be used) to each request to identify the associated logical stream. In another embodiment, the compiler 190 may assign the stream identifier. In an embodiment, the stream identifier may indicate the priority of the stream. In an embodiment, the user of the application 192 may specify the priority of streams based, e.g., on knowledge of the properties of the streams or the level of importance/criticality of the stream. In another embodiment, the developer of the application 192 may specify the priority of the streams based, e.g., on the knowledge of the properties of the streams. In another embodiment, the manufacturer of the application 192 may specify the priority of the streams based, e.g., on its intended functionality. In an embodiment the number of physical request streams (N) may be the same as the number of logical request streams (M). In another embodiment, M and N may be different.

Control then continues to block 415 where the cache controller 136 divides the set into M subsets, each subset containing S/M ways where "S" is the number of ways in each set in the cache 137. In another embodiment, the cache controller 136 may divide the set into M subsets, with each subset containing a number of ways determined by the cache designer, wherein the number of ways in each subset may be equal or some or all may be different from each other.

Control then continues to block 420 where the cache controller 136 searches through all tags in the set for each cache lookup/access request for a given stream and locates the requested block if it is present in the cache 137. Control then continues to block 422 where the cache controller 136 determines whether the requested data was found in block 420.

If the determination at block 422 is true, the data is found in the cache 137, so control continues to block 424 where the cache controller 136 returns the data from the cache 137 to the instruction executing on the processor 135 that requested the data. Finding the requested data in the cache 137 is called a cache hit. Controller then continues to block 499 where the function returns.

If the determination at block 422 is false, then the data is not found in the cache 137, so the cache controller 136 generates a cache miss, which may cause the cache controller 136 to look for the data in another level of the cache 137 (if one is present) or the processor 135 may request the data from another level of storage, which may be the memory 139 or the storage device 140. If the processor 135 finds the requested data in another level of storage, then control continues to block 425 where the data is brought into the cache 137, and the cache controller 136 may allocate the data block into the $I^{th}$ subset of the cache 137, where I is the identifier of the logical request stream and the identifier of the associated subset. Control then continues to block 499 where the function returns.

Any appropriate cache replacement policy may be used, depending on the type of cache being used, the properties of the streams, and the operating environment. Existing replacement policies can be used for each subset instead of for each set.

In the previous detailed description of exemplary embodiments of the invention, reference was made to the accompanying drawings (where like numbers represent like elements), which form a part hereof, and in which was shown by way of illustration specific exemplary embodiments in which the invention may be practiced. These embodiments were described in sufficient detail to enable those skilled in the art to practice an embodiment of the invention, but other embodiments may be utilized and logical, mechanical, electrical, and other changes may be made without departing from the scope of an embodiment of the present invention. The previous detailed description is, therefore, not to be taken in a limiting sense, and the scope of embodiments of the present invention is defined only by the appended claims.

Numerous specific details were set forth to provide a thorough understanding of embodiments of the invention. However, embodiments of the invention may be practiced without these specific details. In other instances, well-known circuits, structures and techniques have not been shown in detail in order not to obscure embodiments of the invention.

What is claimed is:

1. A method comprising:
   dividing requests to a cache into a plurality of logical streams;
   assigning each of the requests a stream identifier; and
   dividing a set in the cache into a plurality of subsets corresponding to the plurality of logical streams;
   wherein dividing the set further comprises:
      dividing the set into first and second subsets, each corresponding to a respective stream in the plurality of logical streams, wherein the first subset comprises X ways and the second subset comprises S–X ways, wherein X comprises a positive integer greater than zero, and S comprises a number of ways in the set and S is a positive integer greater than X, and wherein X is a configurable parameter.

2. The method of claim 1, further comprising:
   determining whether an address associated with a request has data in the set.

3. The method of claim 2, further comprising:
   when the address does not have data in the set, allocating a block into one of the plurality of subsets corresponding to the stream associated with the block.

4. The method of claim 2, further comprising:
   when the address does have data in the set, returning the data to a requester.

5. A method comprising:
   dividing requests to a cache into a plurality of logical streams;
   assigning each of the requests a stream identifier; and
   dividing a set in the cache into a plurality of subsets corresponding to the plurality of logical streams;
   wherein dividing the set further comprises:
      dividing the set into a plurality of subsets, each corresponding to a respective stream in the plurality of logical streams, wherein each subset comprises S/M ways, wherein S comprises a number of ways in the set and M comprises a number of the plurality of logical streams, and wherein S is an integer multiple of M and M is a positive integer greater than zero, and wherein M is a configurable parameter.

6. The method of claim 5, further comprising:
   determining whether an address associated with a request has data in the set.

7. The method of claim 6, further comprising:
   when the address does not have data in the set, allocating a block into one of the plurality of subsets corresponding to the stream associated with the block.

8. The method of claim 6, further comprising:
   when the address does have data in the set, returning the data to a requester.

9. A signal-bearing medium comprising instructions, which when read and executed by a processor comprise:
   partitioning a set in a cache into a plurality of subsets corresponding to a plurality of streams; and
   allocating a block in a first subset of the plurality of subsets, wherein the first subset is associated with a first stream of the plurality of streams, which is associated with a request, which is associated with the block;
   wherein the partitioning further comprises:
      dividing the set into the first subset and a second subset, wherein the first subset comprises X ways and the second subset comprises S–X ways, wherein X comprises a positive integer greater than zero, and S comprises a number of ways in the set and S is a positive integer greater than X, and wherein X is a configurable parameter.

10. The signal-bearing medium of claim 9, wherein the allocating further comprises:
    assigning the request a stream identifier.

11. The method of claim 9, wherein X is found in a configuration file.

12. The method of claim 9, wherein X is changed by an application.

13. the method of claim 9, wherein X is changed by a user of an application.

14. The method of claim 9, wherein X is changed by a compiler.

15. A signal-bearing medium comprising instructions, which when read and executed by a processor comprise:
    partitioning a set in a cache into a plurality of subsets corresponding to a plurality of streams; and
    allocating a block in a first subset of the plurality of subsets, wherein the first subset is associated with a first stream of the plurality of streams, which is associated with a request, which is associated with the block;
    wherein the partitioning further comprises:
       dividing the set into the plurality of subsets, wherein the each subset comprises S/M ways, wherein S comprises a number of ways in the set and M comprises a number of the plurality of streams, and wherein S is an integer multiple of M and M is a positive integer greater than zero, and wherein M is a configurable parameter.

16. The signal-bearing medium of claim 15, wherein the allocating further comprises:
    assigning the request a stream identifier.

* * * * *